（12）United States Patent
Chavez et al.

(10) Patent No.: US 9,961,205 B1
(45) Date of Patent: May 1, 2018

(54) MOBILITY BONDING NETWORK

(71) Applicant: Avaya Inc., Santa Clara, CA (US)

(72) Inventors: David Chavez, Broomfield, CO (US);
Gregory D. Weber, Westminster, CO (US)

(73) Assignee: Avaya Inc., Santa Clara, CA (US)

( * ) Notice: Subject to any disclaimer, the term of this patent is extended or adjusted under 35 U.S.C. 154(b) by 0 days. days.

(21) Appl. No.: 15/333,397

(22) Filed: Oct. 25, 2016

Related U.S. Application Data

(60) Provisional application No. 62/401,616, filed on Sep. 29, 2016, provisional application No. 62/352,842, filed on Jun. 21, 2016.

(51) Int. Cl.
| | |
|---|---|
| *H04M 3/00* | (2006.01) |
| *H04M 5/00* | (2006.01) |
| *H04M 3/51* | (2006.01) |
| *H04M 3/523* | (2006.01) |
| *H04M 3/54* | (2006.01) |
| *H04M 3/42* | (2006.01) |
| *H04L 29/08* | (2006.01) |

(52) U.S. Cl.
CPC ........ *H04M 3/5191* (2013.01); *H04L 67/146* (2013.01); *H04M 3/42059* (2013.01); *H04M 3/5235* (2013.01); *H04M 3/543* (2013.01)

(58) Field of Classification Search
CPC ........... H04M 3/5191; H04M 3/42059; H04M 3/5235; H04M 3/543; H04L 67/146
USPC ............................. 379/265.09, 265.01, 309
See application file for complete search history.

(56) References Cited

U.S. PATENT DOCUMENTS

| | | | | |
|---|---|---|---|---|
| 5,884,032 A | * | 3/1999 | Bateman ........... | G06F 17/30899 370/356 |
| 7,443,972 B1 | * | 10/2008 | Barlow ............. | H04M 3/42263 379/201.01 |
| 8,494,506 B2 | | 7/2013 | Kuhl et al. | |
| 2003/0091028 A1 | * | 5/2003 | Chang ................. | H04M 7/0057 370/352 |
| 2012/0195306 A1 | * | 8/2012 | Lund ..................... | H04M 1/247 370/352 |

FOREIGN PATENT DOCUMENTS

CN           105321007        2/2016

* cited by examiner

*Primary Examiner* — Quynh Nguyen
(74) *Attorney, Agent, or Firm* — Sheridan Ross P.C.

(57) ABSTRACT

Embodiments of the disclosure provide a mobile-specific intermediary replacement for the toll free service. This mobile intermediary entity or service can provide four primary call invocation types. Namely, calls can be invoked through a dialer of the mobile device, through a web interface accessed through the mobile device, through a mobile application executing on the mobile device, or through a personal assistant of similar service. The mobile intermediary entity or service can also provide rich, supplementary services for mobile callers. These services can include but are not limited to menu navigation, call continuity, caller geo-location awareness, and awareness of the caller's mobile network operator's identifier. Services natively provided by the called enterprise, such as call conferencing, can also be provided within the call.

18 Claims, 5 Drawing Sheets

MOBILITY BONDING NETWORK

CROSS REFERENCE TO RELATED APPLICATION

The present application claims the benefits of and priority, under 35 U.S.C. § 119(e), to U.S. Provisional Application No. 62/352,842 filed Jun. 21, 2016 by Chavez and entitled "Mobility Bonding Network" and U.S. Provisional Application No. 62/401,616 filed Sep. 29, 2016 by Chavez and entitled "Mobility Bonding Network" of which the entire disclosure of each is incorporated herein by reference for all purposes.

FIELD OF THE DISCLOSURE

Embodiments of the present disclosure relate generally to methods and systems for handling of a call from a mobile device and more particularly to replacing the toll free system with a mobile-only solution that provides a set of services in a mobile integration for businesses.

BACKGROUND

While there are a growing number of digital touch points for customer to business interactions, such as email and social media, for many enterprises three touch points still currently dominate—a physical storefront, a website, and a voice contact center. The manner that a customer typically interacted with each of these touch points has been walking into an establishment, surfing to the corporate website via a computer, and dialing a toll-free 1-800 number from a telephone. The rapid adoption of mobile and the penetration of smartphones within the mobile arena are providing an opportunity to transform how customers experience these touch points. When a customer walks into a retail location, they predictably have a mobile device with them. When a customer visits a corporate website, there is a high probability they are surfing from a mobile smartphone or tablet. When a customer dials a toll-free 1-800 number, they are now typically calling from a mobile smartphone.

In each of these situations, there is a strong desire to provide an optimal mobile experience. Many retail locations are aggressively transforming to leverage the customer's mobile smartphone—from Quick Response (QR) codes that can be scanned for supplementary information and special offers, tracking a customer's location within the store, and accepting payments directly from the mobile device, to name a few. Corporate websites have also transformed to accommodate the adoption of smartphones. In the past, enterprises were happy enough to push a website that was designed for a stationary desktop computer with a large screen and a mouse to a smartphone. In today's world, this was no longer sufficient, thus enterprises enhanced website surfing for mobile customers. Simply, if a customer was attempting to access a corporate website from a smartphone, this was detected and the customer was redirected to the mobile web where an optimized version of the website for smartphones resided.

Unlike these transformations described above, when a mobile customer calls a toll-free 1-800 number with a smartphone to reach a contact center, their experience is no better, and sometimes even worse, than a customer calling from a basic telephone at home. The Mobile Bonded Network solution addresses this significant industry gap without requiring a complete refactoring of existing contact centers.

1-800 toll-free service was invented for the era where national calls were tariffed differently than local calls. Calls placed outside a local calling area would incur a charge. Businesses had two options for offering a service for customers to call them and not wanting the customer to incur a charge from telephony service providers. They could secure numbers for each local calling area. Besides being expensive to source, this approach presents the challenges to educate customers about what number they should dial to reach the business and further, to aggregate such calls efficiently for contact center ingress. Instead, most businesses opted for a common number that was addressable nationwide and would carry a specific route such that calls made to that number would not incur a charge to the caller, but instead would be paid for by the enterprise being reached. An entire industry was born from that innovation. In today's modern world, a significant majority of calls coming into contact centers are originating from mobile devices. In America, mobile calling plans do not distinguish between local and non-local calls, thus toll-free service no longer presents a benefit to the caller; however it still causes the enterprise to incur significant charges.

Furthermore, the toll-free number service offered to enterprises from carriers included the ability to pass supplementary information, specifically Automatic Number Identification (ANI). Enterprises leveraged this basic information to assist in routing decisions and customer identification. However, in today's modern world, the value of ANI has decreased significantly. Number portability, an initiative to support mobile users, has rendered implied location from ANI, used in routing decisions, largely ineffective. Additionally, the ability for customers to easily spoof their Caller Identification (CLID) has made identifying customers based on it essentially useless.

And finally, the toll-free services launched by carriers made the assumption that a customer was initiating their call from a landline telephone. Because of this assumption, the toll-free services only considered the voice channel into the contact center, the quality of this connection was without question, and the only viable method to interact with automated systems was via audible menus and touchtone responses. In today's modern world, this base assumption and resulting postulations are no longer valid. Mobile smartphones support many channels other than voice that customers want to leverage, the quality and stability of the mobile connection cannot be taken for granted, and the mobile smartphone has the capabilities to provide a rich visual interaction experience through a touchscreen interface.

BRIEF SUMMARY

Embodiments provide a mobile bonded network solution that addresses these toll-free service shortcomings for today's mobile customer society. These embodiments attempt to redirect incoming voice calls destined for a contact center to a mobile web based on whether the call originated from a mobile device and if the customer desires an optimal mobile experience. In many cases the customer is able to complete their interaction through the mobile web. However, there are some circumstances whereby a customer may still desire to communicate with a live contact center agent. In these cases, an agent bonding service can be invoked from the mobile web to bring the customer and a contact center agent together. To achieve this, the agent bonding service can place a call, augmented with customer session context, to the agent and then extend the call out to the customer.

Thus, there are situations in which a mobile customer still communicates with a contact center agent within the mobile bonded network solution described herein. One situation can be when the customer does not want a mobile experience and opts for a connection with the contact center agent from the front-door redirection service. In another situation, the customer may want to escalate from the mobile web to a live agent conversation facilitated by the agent bonding service. In these situations, a mobile call continuity service can provide additional session reliability for the customer's mobile connection. Whenever there is an unexpected disconnect from the customer, this service can keep the session up with respect to the contact center and ask the agent if they would like to reconnect the customer to the conversation. Upon agent confirmation, the mobile call continuity service can rejoin the customer back into the current session.

According to one embodiment, providing a mobility bonded network service can comprise receiving, by a redirection service, a setup message for a voice call from a device on a mobile network operator network and determining, by the redirection service, whether to redirect the device to a mobile web or forward the received setup message for the voice call to a contact center. In response to determining to redirect the device to the mobile web, the redirection service can orchestrate a redirection of the device to the mobile web and terminate the voice call. In response to determining to forward the received setup message for the voice call to the contact center, the redirection service can enhance the setup message with auxiliary customer information and forward the enhanced set up message from the redirection service to the contact center.

Determining whether to redirect the device to the mobile web or forward the received setup message for the voice call to the contact center can comprise validating an invocation of the redirection service based on the received setup message and offering a mobile-specific experience to a caller through the device. Determining whether to redirect the device to the mobile web or forward the received setup message for the voice call to a contact center can be based on an answer to the offer received from the device.

Orchestrating the redirection of the device to the mobile web can comprise creating a link to a destination of the mobile web specific to a caller and based on customer data for the caller and providing the created link to the device.

A request for a voice call connection with an agent of the contact center can be received by an agent bonding service from the device after the device has been redirected to the mobile web. The request can include parameters defining a context of the request. The agent bonding service can query the contact center for an available agent based on the parameters defining the context of the request and receive from the contact center an indication of an available agent or an estimated wait time until an agent is available. In response to receiving the indication of the available agent, the agent bonding service can initiate a voice call between the device and the available agent and launch a mobile call continuity service. In response to receiving the estimated wait time until the agent is available, the agent bonding service can provide the received estimated wait time to the device.

Enhancing the setup message with auxiliary customer information and forwarding the enhanced set up message to the contact center can comprise retrieving the auxiliary information from a repository of customer data, the auxiliary information providing a context for the voice call and attaching the retrieved auxiliary information to the received set up message to form the enhanced message. A number indicated by an entity operating the contact center can be determined. For example, the set up message for the voice call can comprise a call to a toll free number and the number indicated by the entity operating the contact center can be selected based on a current location of the device or a billing address of an owner of the device. The enhanced message with the attached auxiliary information can be forwarded to the number indicated by the entity operating the contact center and a mobile call continuity service can be launched.

The mobile call continuity service can maintain a voice call between the device and an agent of the contact center by monitoring the voice call for an unexpected disconnection of the device. Upon detecting an unexpected disconnection of the device, the agent of the contact center can be offered to an opportunity to reconnect to the device. In response to receiving an answer from the agent of the contact center indicating a selection to reconnect, an attempt can be made to reconnect to the device. Attempting to reconnect the device can comprise one or more of initiating a call to the device or sending a message to the device. The attempt to reconnect the device can be performed in response to detecting availability of the device on the mobile network operator network. In response to receiving an answer from the agent of the contact center indicating a selection to terminate, the voice call can be terminated.

According to another embodiment, a system comprising a mobility bonded network service can comprise a processor and a memory coupled with the processor and comprising a set of instruction stored therein which, when executed by the processor, causes the processor to provide a redirection service by receiving a setup message for a voice call from a device on a mobile network operator or mobile virtual network operator network, and determining whether to redirect the device to a mobile web or forward the received setup message for the voice call to a contact center. In response to determining to redirect the device to the mobile web, a redirection of the device to the mobile web can be orchestrated and the voice call can be terminated. In response to determining to forward the received setup message for the voice call to the contact center, the setup message can be enhanced with auxiliary customer information and forwarded to the contact center.

Determining whether to redirect the device to the mobile web or forward the received setup message for the voice call to the contact center can comprise validating an invocation of the redirection service based on the received setup message and offering a mobile-specific experience to a caller through the device. Determining whether to redirect the device to the mobile web or forward the received setup message for the voice call to a contact center can be based on an answer to the offer received from the device.

Enhancing the setup message with auxiliary customer information and forwarding the enhanced set up message to the contact center can comprise retrieving the auxiliary information from a repository of customer data, the auxiliary information providing a context for the voice call, attaching the retrieved auxiliary information to the received set up message to form the enhanced message, determining a number indicated by an entity operating the contact center, and forwarding the enhanced message with the attached auxiliary information to the number indicated by the entity operating the contact center Orchestrating the redirection of the device to the mobile web can comprise creating a link to a destination of the mobile web specific to a caller and based on customer data for the caller and providing the created link to the device.

The system can further comprise an agent bonding service. The agent bonding service can comprise a processor and a memory coupled with the processor and comprising a set of instructions stored therein which, when executed by the processor, causes the processor to bond an agent of the contact center to a voice call by receiving, from the device, a request for the voice call with the agent of the contact center. The request can be received after the device has been redirected to the mobile web and can include parameters defining a context of the request. A query can be made to the contact center for an available agent based on the parameters defining the context of the request and an indication of an available agent or an estimated wait time until an agent is available can be received from the contact center. In response to receiving the indication of the available agent, the voice call can be initiated between the device and the available agent and a mobile call continuity service can be launching. In response to receiving the estimated wait time until the agent is available, the received estimated wait time can be provided to the device.

The system can further comprise a mobile call continuity service. The mobile call continuity service can comprise a processor and a memory coupled with the processor and comprising a set of instructions stored therein which, when executed by the processor, causes the processor to maintain a voice call between the device and an agent of the contact center by monitoring the voice call for an unexpected disconnection of the device and upon detecting an unexpected disconnection of the device, offering to the agent of the contact center an opportunity to reconnect to the device. In response to receiving an answer from the agent of the contact center indicating a selection to reconnect, an attempt to reconnect to the device can be made. In response to receiving an answer from the agent of the contact center indicating a selection to terminate, the voice call can be terminated.

The redirection service, the agent bonding service, and the mobile call continuity service can each be located on the mobile network operator or mobile virtual network operator network. Alternatively, the redirection service and the agent bonding service can each be located on the mobile network operator or mobile virtual network operator network and the mobile call continuity service can be located outside of the mobile network operator or mobile virtual network operator network. In other cases, the redirection service can be located on the mobile network operator or mobile virtual network operator network and the agent bonding service and the mobile call continuity service can each be located outside of the mobile network operator or mobile virtual network operator network. In yet other cases, the redirection service, the agent bonding service, and the mobile call continuity service can each be located outside of the mobile network operator or mobile virtual network operator network.

According to another embodiment, non-transitory computer readable medium can comprise a set of instructions stored therein which, when executed by a processor, causes the processor to provide a mobility bonded network by receiving, by a redirection service, a setup message for a voice call from a device on a mobile network operator or mobile virtual network operator network and determining, by the redirection service, whether to redirect the device to a mobile web or forward the received setup message for the voice call to a contact center. In response to determining to redirect the device to the mobile web, a redirection of the device to the mobile web can be orchestrated by the redirection service and the voice call can be terminated. In response to determining to forward the received setup message for the voice call to the contact center, the setup message can be enhanced by the redirection service with auxiliary customer information and the enhanced set up message can be forwarded from the redirection service to the contact center.

Figure 1:
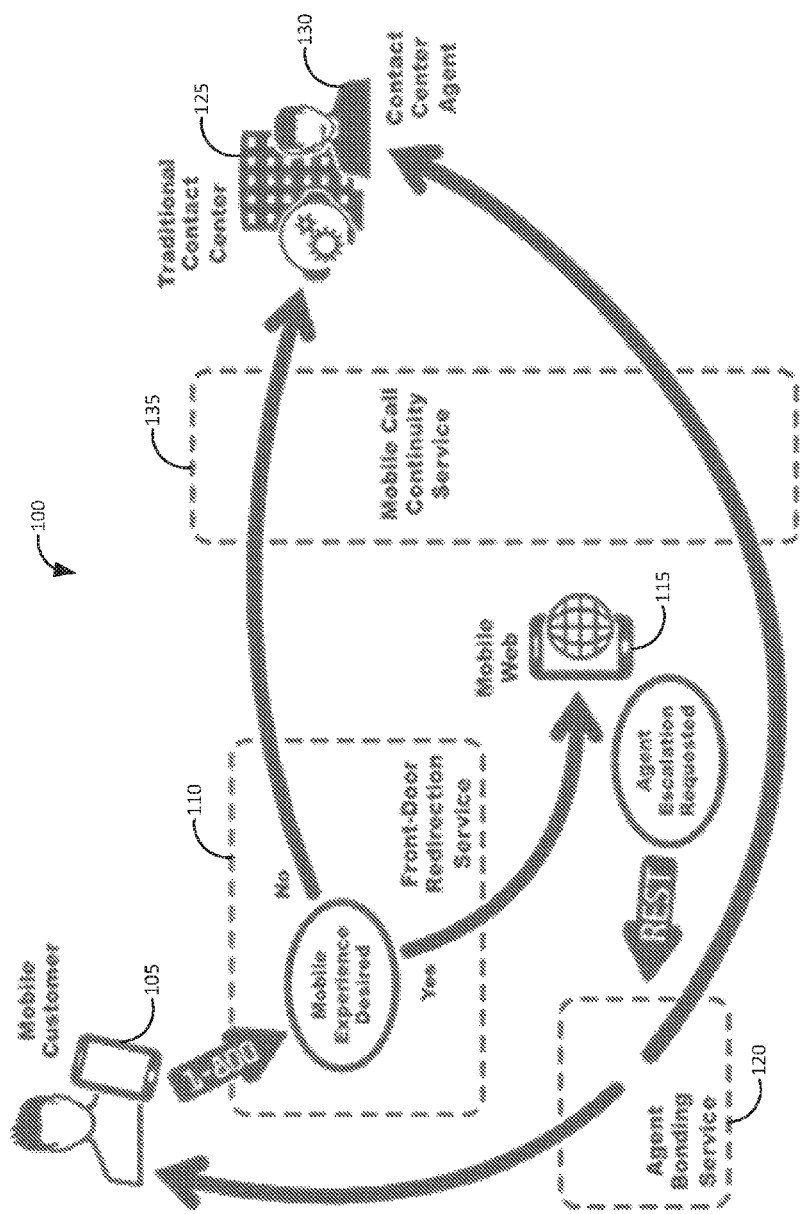
FIG. 1 is a diagram illustrating components of a system providing a mobile bonded network solution according to one embodiment.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel®

Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Embodiments of the disclosure provide systems and methods for providing a mobile-only solution for businesses using numbers that don't carry meaningless charges associated with them (e.g., toll free numbers) with methods used to invoke calls and services expanded beyond what a dialer could previously offer. More specifically, embodiments provide a mobile-specific intermediary replacement for the toll free service. This mobile intermediary entity or service can provide four primary call invocation types. Namely, calls can be invoked through a dialer of the mobile device, through a web interface accessed through the mobile device, through a mobile application executing on the mobile device, or through a personal assistant of similar service.

The mobile intermediary entity or service can also provide rich, supplementary services for mobile callers. These services can include but are not limited to menu navigation, call continuity, caller geo-location awareness, and awareness of the caller's mobile network operator's identifier. Services natively provided by the called enterprise, such as call conferencing, can also be provided within the call. Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating components of a system providing a mobile bonded network solution according to one embodiment. As used herein, the terms mobile bonded network and mobility bonded network can be considered to refer to a set of physical and/or virtual network connections over which functions and/or services specific to use with a mobile device can be provided. As illustrated in this example, the system 100 can include a mobile customer 105, a front-door redirection service 110, a mobile web 115, an agent bonding service 120, a contact center 125, a contact center agent 130, and a mobile call continuity service 135. Generally speaking, when the front-door redirection service 110 receives from the mobile customer 105 calls destined for the contact center 125, the front-door redirection service 110 can attempt to redirect the incoming voice to the mobile web 115 based on whether the call originated from a mobile device and if the customer desires an optimal mobile experience. If the call from the mobile customer 105 is from a mobile device and the customer elects to receive the mobile-specific service, the front-door redirection service 110 can redirect or route the call to the mobile web 115. If the call from the mobile customer 105 is not from a mobile device or if the customer opts out of the mobile-specific service, the front-door redirection service 110 can redirect or route the call to the contact center 125.

In many cases the mobile customer 105 can complete their interaction through the mobile web 115. However, there are some circumstances whereby a mobile customer 105 may still desire to communicate with a contact center agent 130. In these cases, the agent bonding service 120 can be invoked from the mobile web 115 to bring the mobile customer 105 and the contact center agent 130 together. To achieve this, the agent bonding service 120 can place a call, augmented with customer session context, to the contact center agent 130 and then extend the call out to the mobile customer 105.

Thus, there are situations in which a mobile customer 105 communicates with the contact center agent 130 within the mobile bonded network system 100. One situation can be when the mobile customer 105 does not want a mobile-specific service and opts for a connection with the contact center agent 130 from the front-door redirection service 110. In another situation, the mobile customer 105 may want to escalate from the mobile web 115 to a conversation with the contact center agent 130 and facilitated by the agent bonding service 120. In these situations, a mobile call continuity service 135 can provide additional session reliability for the customer's mobile connection. Whenever there is an unexpected disconnect from the mobile customer 105, the mobile call continuity service 135 can keep the session up with respect to the contact center 125 and ask the contact center agent 130 if they would like to reconnect the mobile customer 105 to the conversation. Upon contact center agent 130 confirmation, the mobile call continuity service 135 can rejoin the mobile customer 105 back into the current session.

The system 100 providing the mobile bonded network solution can be deployed in a number of different configurations or according to a number of different deployment models. The deployment models can differ on where the front-door redirection service 110 is deployed and, thus, how it is invoked. According to the deployment model of one embodiment, the front-door redirection service 110 can be deployed within a mobile carrier network core. In this model, the front-door redirection service 110 can be invoked on behalf of the mobile customer 105 and sequenced as part of the origination processing for the attempted call to an enterprise's contact center 125. Under this model, the mobile customer 105 can be redirected to an optimal experience provided by the mobile web 115 without unpredictably consuming resources of the contact center 125. Additionally, the enterprise providing the contact center 125 avoids any toll-free service charges for this interaction. The enterprise also does not incur any toll-free charges in the case of an escalation from the mobile web 115 to a contact center agent 130 via the agent bonding service 120. As discussed in greater detail below, the agent bonding service 120 can bond the mobile customer 105 to the contact center agent 130 by amalgamating two outbound calls together with neither leveraging the toll-free service. One of the calls can be launched by the agent bonding service 120 to the number of the mobile customer 105 and the other call routed by the agent bonding service 120 to the contact center agent 130. Furthermore, this bonding can be performed once the contact center agent 130 becomes available thus eliminating expensive queuing by the contact center 125.

According to another embodiment, the front-door redirection service 110 can be deployed by an enterprise itself, i.e., the enterprise providing the contact center 125. In such a deployment model, the front-door redirection service 110 can be invoked after the call from the mobile customer 105 is routed to the contact center 125 via the toll-free service. The customer experience advantage and improved optimization of contact center resources described above still exist in this model. However, the enterprise still incurs some of the toll-free charges from the carrier. Billing for 1-800 toll-free services has both a connection charge, which remains in this model, and a per-minute charge, which is virtually eliminated.

According to various embodiments, the agent bonding service 120 and the mobile call continuity service 135 can either or both be deployed within the carrier network or within the enterprise domain. For practicality reasons, if the front-door redirection service 110 is deployed within an enterprise domain, then these other two services can be as well. However, if the front-door redirection service 110 is deployed within the mobile carrier network, the agent bonding service 120 and the mobile call continuity service 135 may be deployed in the carrier network, the enterprise domain, or elsewhere. As used herein, the term carrier network can be considered to refer to a Mobile Network Operator (MNO) network, a Mobile Virtual Network Operator (MVNO) network, or both. Both an MNO network and an MVNO network can comprise facilities, equipment, and service to provide mobile communications and related services to any number of mobile devices connected with those networks. As can be understood by one skilled in the art, the primary difference between MNO network and MVNO network may be that MNO network can comprise equipment owned by the operator of the MNO network while MVNO network can comprise some or all equipment owned by another entity and used by the operator of the MVNO network under a lease or other agreement.

According to one embodiment, the agent bonding service 120 can be invoked through a web services call from the mobile web 115. The agent bonding service 120 can consume this event regardless of where it is deployed, i.e., in the carrier network, within the enterprise domain, or elsewhere. Once this service is triggered it can orchestrate a call to an appropriate contact center agent 130, with contextual information, and then launch the session to the mobile customer 105. There can be a number of considerations depending on where the service is deployed. For example, if the agent bonding service 120 is deployed in the carrier network, then attention should be given so that the contextual information, such as subscriber identity and current location, added to the call by the agent bonding service 120, is not stripped off by other components, such as Session Border Controllers (SBC), along the route to the enterprise. Additionally, the agent bonding service 120 may wait and not start the process of reaching out to the mobile customer 105 unless or until there is an available agent resource. Therefore, according to one embodiment, the agent bonding service 120 can receive updates on agent assignments sent from the contact center 125 into the carrier network. These and other considerations are discussed in greater detail below with reference to FIG. 4.

In different deployment models, the mobile call continuity service 135 can also be deployed in the carrier network or within the enterprise domain. The mobile call continuity service 135 can be invoked when the customer initially attempts to call a toll-free number and opts for a traditional experience. In another case, the mobile call continuity service 135 can be invoked when the customer escalates from the mobile web 115 to have a contact center agent 130 interaction. In the first case, the mobile call continuity service 135 can be instantiated immediately or soon after the front-door redirection service 110 executes. If front-door redirection service 110 and mobile call continuity service 135 are co-located, then invocation is another step in the workflow. If the mobile call continuity service 135 is deployed within the enterprise domain, while the front-door redirection service 110 is still deployed in the carrier network, then another method can be used to orchestrate the mobile call continuity service 135 and the front-door redirection service 110 or the mobile call continuity service 135 can determine whether the caller is indeed a mobile user. If the mobile call continuity service 135 is invoked when the customer escalates from the mobile web 115 to have a contact center agent 130 interaction, the mobile call continuity service 135 can be instantiated when the contact center agent 130 is bonded to the mobile customer 105. If the mobile call continuity service 135 is deployed in the same place as the agent bonding service 120, instantiation of the mobile call continuity service 135 can be performed as a next step in the workflow. However, if the agent bonding service 120 is deployed within the enterprise domain and the mobile call continuity service 135 is deployed within the carrier network, then other methods can be used to trigger the mobile call continuity service 135. Some of these other methods can include, but are not limited to, leveraging known connections between the enterprise and the carrier, referred to as mobile bonded trunks 260, which can invoke the service as part of origination sequencing, on behalf of the enterprise, or part of termination sequencing on behalf of the mobile customer if criteria is met. These and other considerations are discussed in greater detail below with reference to FIG. 5.

Front-Door Redirection Service 110

According to one embodiment, the front-door redirection service 110 is responsible for intercepting an attempted call from the mobile customer 105 into an enterprise contact center 125 and bids to shift the mobile customer 105 to the mobile web 115. This benefits both the mobile customer 105, by providing a better experience, and the enterprise operating the contact center 125, by reducing both costs and complexity. The workflow executed by the front-door redirection service 110, as will be described in greater detail below with reference to FIG. 3, has three functional legs. The first leg of the workflow determines if it is appropriate to redirect the call to the mobile web 115. This determination can take the form of some basic sanity checks and querying the customer's inclination for a mobile experience. The other two legs are downstream, either enhancing the current call setup with auxiliary customer information on its way to the contact center 125 or orchestrating the mobile customer 105 to the mobile web 115 and terminating the standard voice call respectively.

If the front-door redirection service 110 is deployed in the carrier network, it can be invoked as part of origination processing for the mobile customer 105. If it is deployed within the enterprise domain, it can be invoked as part of termination processing for the enterprise. Either way, the front-door redirection service 110 can be initiated by receiving a message, such as a Session Initiation Protocol (SIP) INVITE message, during the call setup. During the front-door redirection service 110 workflow, the service requires access to the SIP message, the ability to manipulate the SIP message, provide treatment, shuffle media, and possibly terminate the session. As will be described below with reference to FIG. 3, there are three exit points from the workflow executed by the front-door redirection service 110. If the workflow exits after determining whether to direct the call to the mobile web 115, i.e., the first leg, or after enhancing the call setup with auxiliary customer information and forwarding to contact center 125, i.e., the second leg, the SIP session is not terminated and, thus, the SIP INVITE continues and routes accordingly. However, if the workflow executed by the front-door redirection service 110 exits after orchestrating the call to the mobile web 115, i.e., the third leg, the SIP session was terminated since the customer chose instead to have a mobile experience and therefore no further routing occurs for this voice call.

Figure 2:
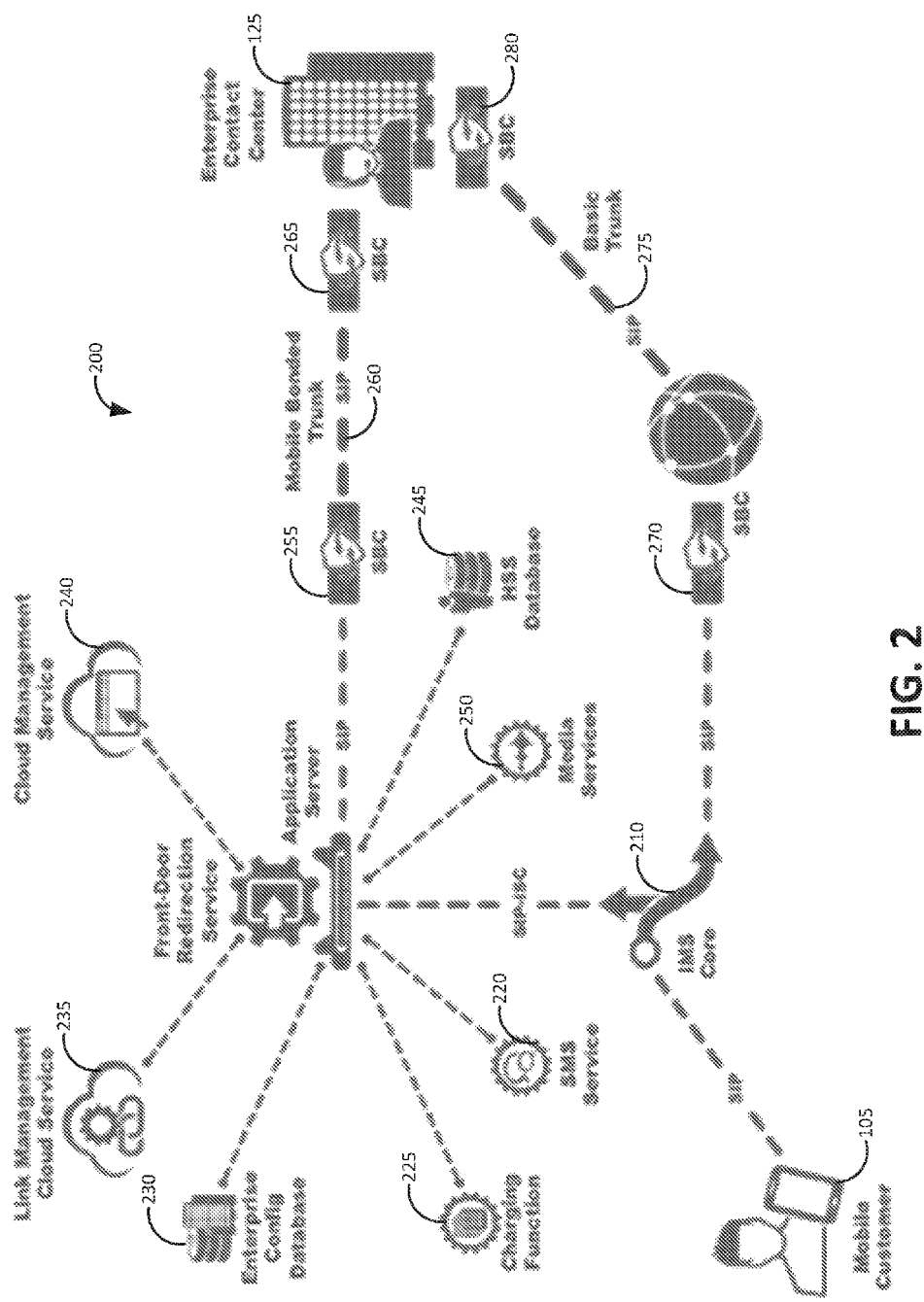
FIG. 2 is a flowchart illustrating a process for providing a front-door redirection service according to one embodiment.

FIG. 2 is a diagram illustrating components of a system in which a front-door redirection service 110 can be deployed according to another embodiment. As illustrated in this example, the system 200 can include one or more application servers 205 providing the front-door redirection service 110. The application server(s) 205 and front-door redirection service 110 can be coupled with the IP Multimedia Subsystem (IMS) core 210 of the mobile carrier's network. The application server(s) 205 and front-door redirection service 110 can also be coupled with one or more services, functions, and/or resources. These services, functions, and/or resources can include, but are not limited to, a Short Message Service (SMS) service 220, one or more charging functions 225, an enterprise configuration database 230, a link management cloud service 235, a cloud management service 240, a Home Subscriber Server (HSS) database 245, and/or one or more media services 250. The application server(s) 205 and front-door redirection service 110 can also be coupled with one or more Session Border Controllers 255. Through these SBCs 255, the application server(s) 205 and front-door redirection service 110 can be coupled with the contact center 125 via a mobile bonded trunck 260 and perhaps one or more SBCs 265 of the contact center 125. Similarly, the IMS core 210 of the carrier's network can also be coupled with one or more SBCs 270. Through these SBCs 270, the IMS core 210 can be coupled with the contact center 125 via a basic truck 275 and perhaps one or more SBCs 280 of the contact center 125.

FIG. 2 illustrates the front-door redirection service 110 deployed within a mobile carrier's IMS network at the application layer. The outcomes delivered by the front-door redirection service 110 can be achieved by intercepting call setups on the IMS core 210 through sequencing, orchestrating a number of services, such as SMS services 220, link management cloud services 235, cloud management services 240, media services 250, etc., and interfacing with database resources such as an enterprise configuration database 230 and/or HSS database 245. In addition to those illustrated and described here, the front-door redirection service 110 can utilize a number of well-known services and components as well as any number of unique services as described below in the detailed explanation of the workflow processes.

In some cases, the front-door redirection service 110 amends the SIP INVITE auxiliary customer information by adding a Multipurpose Internet Mail Extension (MIME) attachment. If this SIP INVITE continues to traverse through the carrier's IMS core 210 or the networks of other providers on its route from the front-door redirection service 110 to the contact center 125, control of the SIP INVITE may be lost. Losing control of the SIP session has many negative implications such as the auxiliary information may be stripped from the message and other entities can view this private data. Therefore, mobile bonded trunks 260 can be used to facilitate a direct connection between the front-door redirection service 110 and the enterprise to avoid this loss of control.

For illustrative simplicity, the configuration in FIG. 2 shows only one mobile bonded trunk 260. However, in various implementations, there may be any number of mobile bonded trunks 260 from the front-door redirection service 110, each with an SBC service. For example, the instantiation of the front-door redirection service 110 may support many independent contact centers 125 simultaneously with each utilizing at least one mobile bonded trunk 260. In other implementations, an enterprise may elect to have multiple ingress points to the contact center 125, for example, based on location or work segmentation. Thus, a single contact center 125 may utilize multiple mobile bonded trunks 260. Accordingly, the front-door redirection service 110 can map customer sessions to the appropriate mobile bonded trunk 260 when multiple trunks are utilized.

The enterprise configuration database 230, as will be seen, is referenced by many of the workflow processes described herein. Generally speaking, this database 230 can contain enterprise parameters for customizing the mobile experience delivered by the front-door redirection service 110 to the customer. According to one embodiment, the toll-free numbers that enterprises have subscribed to for the front-door redirection service 110 can be used as keys into the database 230. Each enterprise record can consists of parameters defining customer interaction and parameters defining where to redirect the session based on the customer goals. According to one embodiment, the enterprise configuration database 230 can be co-located with the front-door redirection service 110.

Figure 3:
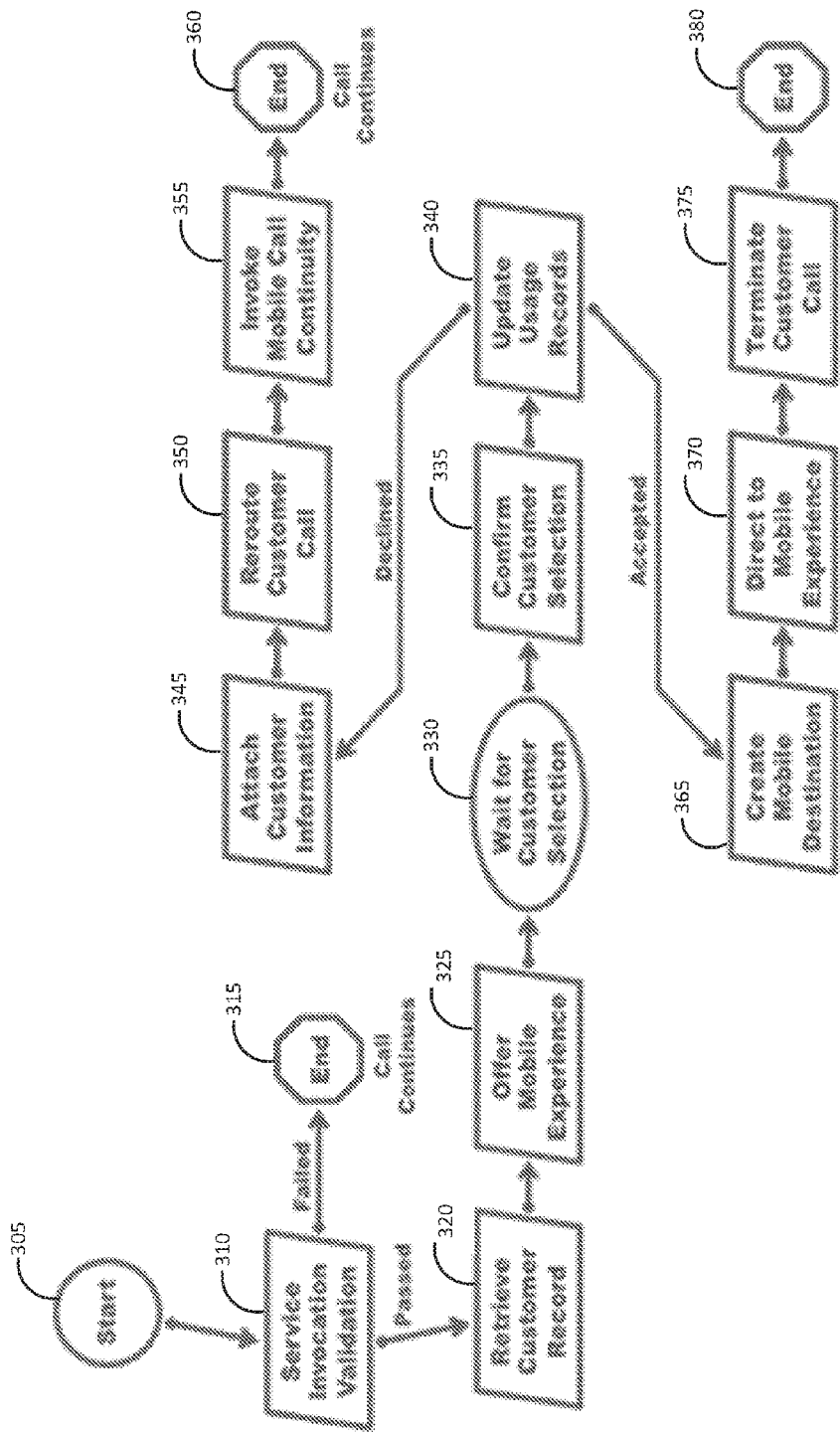
FIG. 3 is a diagram illustrating components of a system in which a front-door redirection service can be deployed according to another embodiment.

FIG. 3 is a flowchart illustrating a process for providing a front-door redirection service according to one embodiment. As illustrated in this example and as noted above, the process can begin with receiving 305 a message, such as a SIP INVITE message, during the call setup and validating 310 the service invocation. Service validation 310 can comprise basic sanity checks to ensure it is appropriate to apply the front-door redirection service 110 functionality to the call. These basic sanity checks can comprise, for example, verifying that the call originated from a mobile device and validating that the enterprise, for which the call is destined, is subscribed to the front-door redirection service 110. How to execute these sanity checks can depend on where the front-door redirection service 110 is deployed.

If the front-door redirection service 110 is deployed in the mobile carrier network, as described above with reference to FIG. 2, then it may be assumed that the first sanity check, verifying the call originated from a mobile user, has already been validated. That is, since the front-door redirection service 110 was invoked during origination sequencing within the mobile carrier network, it may be assumed that the call was from a mobile subscriber. To verify the second sanity check, validating the enterprise subscription status to the service, a database query may be performed on the enterprise configuration database 230. The enterprise configuration database 230 can have records indexed by the enterprise number, e.g., their toll-free 1-800 numbers. However, any generic enterprise Direct Inward Dial (DID) number may be used as a key. The sanity check can be considered confirmed if the enterprise data record exists. That is, by matching the called party in the call setup to the existing database keys, the record can be marked subscribed to in the service.

If the front-door redirection service 110 is deployed within the enterprise domain, then it may be safe to assume that the second sanity check, validating the enterprise subscription status to the service, has already been confirmed. In this deployment, the service is invoked after the call has already been received by the enterprise. Thus, if the enterprise is itself invoking this front-door redirection service 110, it can be assumed that the enterprise subscribed to it. The first sanity check, i.e., verifying the call originated from a mobile user, can be performed by querying the network operator. For example, there are a number of cloud services, invoked through a Representational State Transfer (REST) Application Program Interface (API), that query the service provider for information on the caller. One of the pieces of information that can be received through this query is whether or not the calling party number is a mobile extension.

In either of these configurations, if either of the sanity checks 310 fails, then the front-door redirection service 110 exits 315. It is important to note, this does not necessarily terminate the call setup. Rather, normal processing, such as sequencing other applications, generic SIP routing, and policy enforcement, can continue.

If the service invocation is validated 310, customer records can be retrieved 320. One of the primary uses of the customer data retrieved from the mobile carrier is to provide a personalized experience if redirected to the mobile web 115. Additionally, the customer data can be leveraged to improve the enterprise's ability to identify and authenticate the customer. There is a plethora of available information from the carrier including, to suggest a few, the current location of the mobile subscriber and their associated billing address on record. This customer data can be used to help create the mobile web 115 Uniform Resource Locator (URL) for the redirection scenario. Alternatively, such information can be added to the SIP INVITE message if a traditional experience is desired.

If the front-door redirection service 110 is deployed within the mobile carrier network, then the front-door redirection service 110 can interface with the HSS database 245 to retrieve the customer record. If the front-door redirection service 110 is deployed in the enterprise domain, REST APIs exist to retrieve additional customer data from the mobile carrier. These APIs are not as rich as direct access to a mobile carrier's HSS database 245 and may incur a small charge per query.

Once the customer records have been retrieved 320, the front-door redirection service 110 can offer 325 a mobile experience to the validated mobile caller. The front-door redirection service 110 cannot always assume a customer desires a mobile web 115 experience after trying to reach an enterprise through its 1-800 toll free service. Customer behaviors and expectations do not lend themselves to automatically making this decision. Additionally, there are circumstances, such as when the caller is driving or experiencing a lack of Internet service, that a customer cannot realistically experience the mobile web 115 and thus, the only viable option is to continue to the contact center 125.

According to one embodiment, the front-door redirection service 110 can have an automated dialog with the customer to determine what type of work is being requested and if the customer desires a mobile experience to address this work. Determining the work segment the customer needs allows the front-door redirection service 110 to select the most optimal landing spots. Determining the desire of the customer to have a mobile experience or not allows the front-door redirection service 110 to select the channel for the session, either over mobile bonded SIP trunks 260 to the contact center 125, or through the mobile web 115.

Media services 250 provide the foundation for this interaction by playing the appropriate announcements and waiting for the customer's voice or touch-tone responses. This step of the front-door redirection service 110 workflow can be responsible for instructing the media service to fetch and execute the appropriate Voice Extensible Markup Language (VXML) script. A pointer to the VXML script can be an element of the enterprise record within the enterprise configuration database 230. After determining what work segmentation the customer prefers for this session, the customer can be offered a mobile experience by playing a voice announcement and allowing the customer to respond audibly or with touch-tones.

An example of this announcement can be "We have detected you are on a mobile device. If you would prefer a mobile experience, please say yes or press 1 now." According to one embodiment, this offer can wait for a positive response from the mobile caller to proceed down the mobile experience route. According to another embodiment, if a customer has shown the behavior of typically preferring a mobile experience, which can be easily added to the customer's record in the HSS database 245, then that preference can become the default. Thus the workflow logic can be adjusted to support an announcement such as "We have detected you are on a mobile device. We are redirecting you to a mobile experience, if you would prefer a contact center agent, please say agent or press 1 now."

At this point along the first leg of the workflow, all sanity checks to provide redirection functionality have passed, an attempt has been made to segment the customer based on work requested, and the customer has been offered the opportunity to have a mobile web 115 experience. Therefore, the front-door redirection service 110 can wait 330 for the customer's response, which can be provided when the VXML script executing within the media service has completed. The work segments can be defined by the enterprise and represent general categories of service, such as product line or business unit. The work segment can be determined from an automated dialog with the customer combined with any other known customer context. The work segment can be saved and the customer's decision for a mobile experience can be recorded as accepted or declined.

In other cases, if the VXML script completes or a timer expires without a customer response, the customer's decision can be mapped to being declined and a default work segmentation can be assumed. Alternatively, a lack of response can signify that the offer was accepted or declined based on how the offer was proposed and/or based on historical customer behavior.

After establishing the customer's decision and work segment, the front-door redirection service 110 can confirm 335 the selections audibly with the customer and provide expectations on what occurs next in the workflow. For example, if the customer decision is to decline the mobile experience, the announcement could be "You have declined the mobile experience, your call will now be sent to the contact center 125."

If the customer decision is to accept the mobile experience, the announcement could be "You have accepted the mobile experience. You will receive an SMS message with a mobile web link to continue the interaction. This phone call will now be terminated." This announcement provided to the customer can be intended to mirror the next steps executed by the front-door redirection service 110 workflow. For example, orchestrating the customer to the mobile web 115 can comprise sending a URL via Short Message Service (SMS), which is represented in the example announcement above, and leveraging Rich Communication Services (RCS) to automatically launch to the URL on the customer's mobile device. The announcement can be used to set the appropriate expectations with the customer.

Before either augmenting the call on its route to the contact center 125 or redirecting the customer to the mobile web 115, a usage record can be created 340. If the service is deployed in the carrier network, recording the usage of the front-door redirection service 110 can be useful for generating revenue from the enterprise. These call records can be shared with the carrier's charging functions 225 within their domain allowing the carrier to accurately bill the enterprise. If the service is deployed within the enterprise domain, augmenting contact center 125 reports with front-door redirection service 110 usage can provide the enterprise additional customer behavioral insights.

These usage records create a view on how many times the front-door redirection service 110 was invoked and how often customers chose to have a mobile experience. However, these usage records fail to capture any operational metrics on how often a customer chooses to be redirected to the mobile web 115, receives a mobile web URL, but does not follow through with accessing the mobile web 115. To achieve this insight, an associated cloud contact service record can be created as will be described below.

If the service invocation passed validation 310 but the customer selection 330 declined a mobile experience supplemental customer information can be added 345 to the call setup message. This additional data, such as customer billing address or current location, can assist the enterprise in identifying and authenticating the mobile customer if they choose. The specific parameters added to the SIP INVITE, as a MIME attachment, can be defined in the enterprise record from the enterprise configuration database 230.

There are a few considerations on attaching this information to the SIP INVITE if the front-door redirection service 110 is deployed in a carrier network. Since the mobile experience was declined, the session continued to route to the contact center 125. If this call was routed through another carrier, or carriers, to reach the enterprise, there is no guarantee that the MIME attachment would not be stripped off along its journey. Additionally, this MIME attachment is visible to all entities along the path, which may cause some security and privacy concerns. Many of these same challenges exist even if the entire route of the SIP INVITE would have been contained within a single carrier's IMS network. In order to mitigate these problems, an overwhelming amount of configuration and programmatic coordination would be required by the mobile carrier to ensure accurate delivery. Therefore, according to one embodiment, mobile bonded trunks 260, i.e., direct trunks from the front-door redirection service 110 to the contact center 125, can be configured and used to ensure secure delivery of the MIME attachment.

The SIP INVITE with the MIME attachment can then be rerouted 350 over the mobile bonded trunk 260 to the contact center 125. Even though the customer declined to have an optimal mobile experience at this point in the workflow, the front-door redirection service 110 can still add significant value. If the service is deployed in the carrier network, rerouting 350 the SIP session to a mobile bonded trunk 260 securely and accurately delivers the added customer information and, at the same time, allows the enterprise to avoid 1-800 toll-free service charges. If the front-door redirection service 110 is deployed within the enterprise domain, the call has already reached the enterprise, and thus, it is too late to eliminate 1-800 toll-free service charges. However, rerouting the SIP session can still be beneficial if the enterprise chooses to alter a customer's ingress point into their contact center 125 based on any mobile insight garnered, such as the customer's current location.

To reroute 350 the SIP session, the front-door redirection service 110 can determine which mobile bonded trunk 260 to use and update the SIP INVITE message to reflect this selection. When the service is deployed in the mobile carrier, the mobile bonded trunk 260 can be selected by referencing the enterprise record within the enterprise configuration database 230. This record can contain an array indexed by the work segment assigned to the customer. An element in this array can be the mobile bonded trunk 260 that the rerouted SIP session should traverse. In some implementations, the selection process of which mobile bonded trunk 260 to use can be enhanced to include additional logic beyond only work segmentation such as the customer's current location and operational metrics.

In order to reroute 350 the call to the selected mobile bonded trunk 260, the front-door redirection service 110 can update the SIP INVITE message route set by removing any downstream destinations and adding the associated mobile bonded trunk's SBC. In this way, the SIP session is not returned to the mobile carrier's IMS core 210 but rather is directly sent to the mobile bonded trunk's SBC.

If a mobile carrier chooses to route the SIP session through their IMS network to reach the enterprise, updating the route set may not be an appropriate method to reroute the SIP INVITE. Rather, the Request-URI can be updated with an enterprise DID number. This number can be defined in the enterprise record from the enterprise configuration database 230. Since the route set was unaltered, the session returns to the IMS core 210 after the front-door redirection service 110 completes and a routing process then uses the new Request-URI to then route the session to the contact center 125 over basic SIP trunks 275.

Mobile call continuity services 135 can then be invoked 355. Invoking 355 the mobile call continuity service 135 can be dependent on where the service is deployed with respect to where the front-door redirection service 110 is deployed.

If both of the front-door redirection service 110 and mobile call continuity service 135 are deployed together, both in the carrier network or both within the enterprise domain, then the front-door redirection service 110 can explicitly invoke the mobile call continuity service 135 and not be part of general orchestration. When both services are deployed in the carrier network, the carrier is offering this enhanced mobile call continuity service 135 if the enterprise is subscribing to their service and not for all of their mobile subscribers at large. This determination can be made by the front-door redirection service 110 during service invocation validation 310 as explained above. In the other case, where both services are deployed in the enterprise domain, the enterprise provides the mobile call continuity service 135 for customers calling from a mobile device. Again, this determination can be done by the front-door redirection service 110 during its initial steps.

The other situation is when the front-door redirection service 110 is deployed in the carrier network but the mobile call continuity service 135 is deployed within the enterprise domain. In this situation, invocation 355 of the mobile call continuity service 135 by the front-door redirection service 110 can be omitted. Unlike the front-door redirection service 110 being invoked during origination processing for the caller, the mobile call continuity service 135 is invoked during termination processing 360 into the contact center 125 since it is deployed in the enterprise. As will be described in greater detail below, additional logic may be applied within the mobile call continuity service 135 to ensure it is triggered appropriately.

If the service invocation passed validation 310 and the customer selection 330 accepted a mobile experience the front-door redirection service 110 can create 365 a mobile destination. That is, the front-door redirection service 110 can decide where to send the customer on the mobile web 115 and construct an address for that destination. Where a customer initially lands in the mobile web 115 can be a decision made by the enterprise. According to one embodiment, the mobile customer can be directed to a generic web page. Even though this web page may be designed for the mobile user since it is coming from the mobile web 115, it is not personalized for the customer thus creating a non-optimal experience. According to another embodiment, an enterprise can provide a destination on the mobile web 115 personalized for the customer.

There are a number of different approaches that can be employed to create a personalized mobile web URL for the customer using a base Uniform Resource Identifier (URI) and customer information as parameters. The method to determine the base URI can be the same as the approach to selecting a mobile bonded trunk 260 as described above, i.e., the enterprise record within the enterprise configuration database 230 can be referenced. This record can contain an array that is indexed by the work segment assigned to the customer. Customer data, retrieved by the process described above, can be used to create the URL's query string. The specific query parameters used can be defined in the enterprise record from the enterprise configuration database 230. To support the agent bonding service 120, one of the parameters included can be the mobile user's phone number.

A mobile web page URL can be created by amending the query string to a base URI via a text concatenation function. While the enterprise web server may be ready to service this URL, it may be difficult to share this concatenated address with the mobile user. As described below, one of the methods for communicating the mobile web URL to the customer is via an SMS message. However, the SMS service 220 has message size limitations at 160 characters and it is a common occurrence that the concatenated URL address, especially with a couple of parameters in the query string, exceeds that constraint.

To address this condition, the front-door redirection service 110 can leverage a link management service to shorten the URL exposed to the customer. This web service can create a temporary compact URL that can be shared with the customer. This temporary compact URL can redirect the Hypertext Transfer Protocol (HTTP) request to the full URL hosted by the enterprise.

Some enterprises may prefer to generate a specific landing page for the customer that can be accessed without a query string. In order to accommodate this, the front-door redirection service 110 can query a web service hosted by the enterprise. This process can provide the customer data and work segmentation as parameters when invoking the REST API and is returned a mobile web URL by the enterprise. If this URL exceeds any character limitations, the workflow can then invoke a link management service to shorten the enterprise generated URL.

The front-door redirection service 110 can then direct 370 the customer to a personalized landing spot, as established in the previous step, in the mobile web 115. According to one embodiment, the front-door redirection service 110 can do this by sending the mobile web URL to the customer via an SMS message. Once the SMS message is received and the customer taps, clicks, or otherwise selects it, a web browser can be launched on the mobile device navigating the customer to the personalized landing spot. However, this method is not completely seamless for the customer. It is a two-step process with a shift between applications, the SMS application and the mobile web browser. Furthermore, the SMS service 220 does not guarantee the delivery of messages and, thus, the customer may receive the text message after a long delay or possibly never receive it at all. Also, there is no assurance that the customer actually taps on the URL after receiving it.

According to another embodiment, the front-door redirection service 110 can employ Rich Communication Services (RCS) to orchestrate the customer to the mobile web 115. Using RCS can eliminate the two-step process as the mobile carrier can automatically launch the mobile device's web browser and navigate the customer to the personalized landing spot. Additionally, RCS can provide confirmation that this process was successful or not.

According to one embodiment, the front-door redirection service 110 can orchestrate a customer to the mobile web 115 but does not host the web page or directly track the customer journey through the mobile web 115. However, a number of indirect connections can be made. For example, the front-door redirection service 110 can create a cloud contact service record for the personalized mobile web URL that was generated. Using this cloud contact service record a contact management service, such as from SalesForce or Oracle, can create a view of when and who navigated to this URL. This insight is helpful to the enterprise to understand the effectiveness of the mobile bonded network solution and to also possibly initiate an outbound campaign towards customers who did not select the mobile web URL that was transmitted to them. According to one embodiment, the front-door redirection service 110 could remain in this state until a notification is received from the contact management service that the customer did indeed navigate into the mobile web 115 as planned. If the front-door redirection service 110 never receives this notification, rerouting of the SIP session to the contact center 125 can be performed.

As will be described in greater detail below with reference to the agent bonding service 120, there are situations in which customers desire to escalate from the mobile web 115 to a contact center agent 130. If this occurs, the more context the agent knows about the customer journey the more effective the interaction with the agent will be. This naturally leads to higher Customer Satisfaction (CSAT), improved first-call resolution and decreased call durations. To achieve this, the invocation of the agent bonding service 120 from the mobile web 115 can include parameters that provide insight into the customer's mobile web 115 journey such as information from the cloud contact service record.

Once the customer has chosen a mobile experience and has been orchestrated to the mobile web 115, the front-door redirection service 110 can terminate 375 the original voice call destined for the contact center 125. This can be achieved by sending a SIP CANCEL back to the mobile customer, which tears down the voice call to the mobile device.

Agent Bonding Service 120

As described above, the front-door redirection service 110 enhances business to customer engagement when a customer is mobile by determining if the customer is mobile and then either supplementing the call to the contact center 125 with mobile context, such as with subscriber identity and current location, or orchestrating the customer to the mobile web 115. If a mobile customer chooses to be redirected to the mobile web 115, they may be able to fully satisfy their needs in this channel. However, there may be situations when a customer wants to escalate to a live agent even after initially choosing to be redirected to the mobile web 115. This escalation can be handled by the agent bonding service 120.

According to one embodiment, the agent bonding service 120 can be invoked by a web services call from the mobile web 115. The web services invocation to the agent bonding service 120 can contain parameters, as defined by the enterprise, which can be leveraged by the agent bonding service 120 in different ways. The parameter can include the customer's mobile number. As described above, this parameter can be provided via the query string included in the mobile web URL shared with the customer. The agent bonding service 120 can use this contact information to initiate a SIP session outbound to the customer. Other parameters provided can be used to determine the type of resource the customer is requesting and can be shared with the contact center agent 130 as additional context for the interaction.

Click-to-call launches the native client on the mobile device and instructs it to initiate a call to a designated contact number. This approach is not efficient. First, the customer is required to explain why they are calling and may possibly be queued if the contact center 125 does not have an agent resource to immediately available to service them. According to one embodiment, the agent bonding service 120 reaches outbound to the mobile customer after an agent resource is available to interact with them and after they are already connected to the session. The agent bonding service 120 can provide updates to the mobile web 115 on how long the Expected Wait Time (EWT) is for the contact center 125 to initiate an outbound connection to them. Fittingly, the mobile customer can decide to cancel the request at any time after the attempt to escalate to an agent has been made but before the agent reaches out to them. In this situation, the mobile web 115 can make another web services call to cancel the escalation. If the agent bonding service 120 succeeds in bringing the agent and customer together into a session, the service can exit the SIP session but the established session between the mobile customer and the contact center 125 can continue.

Figure 4:
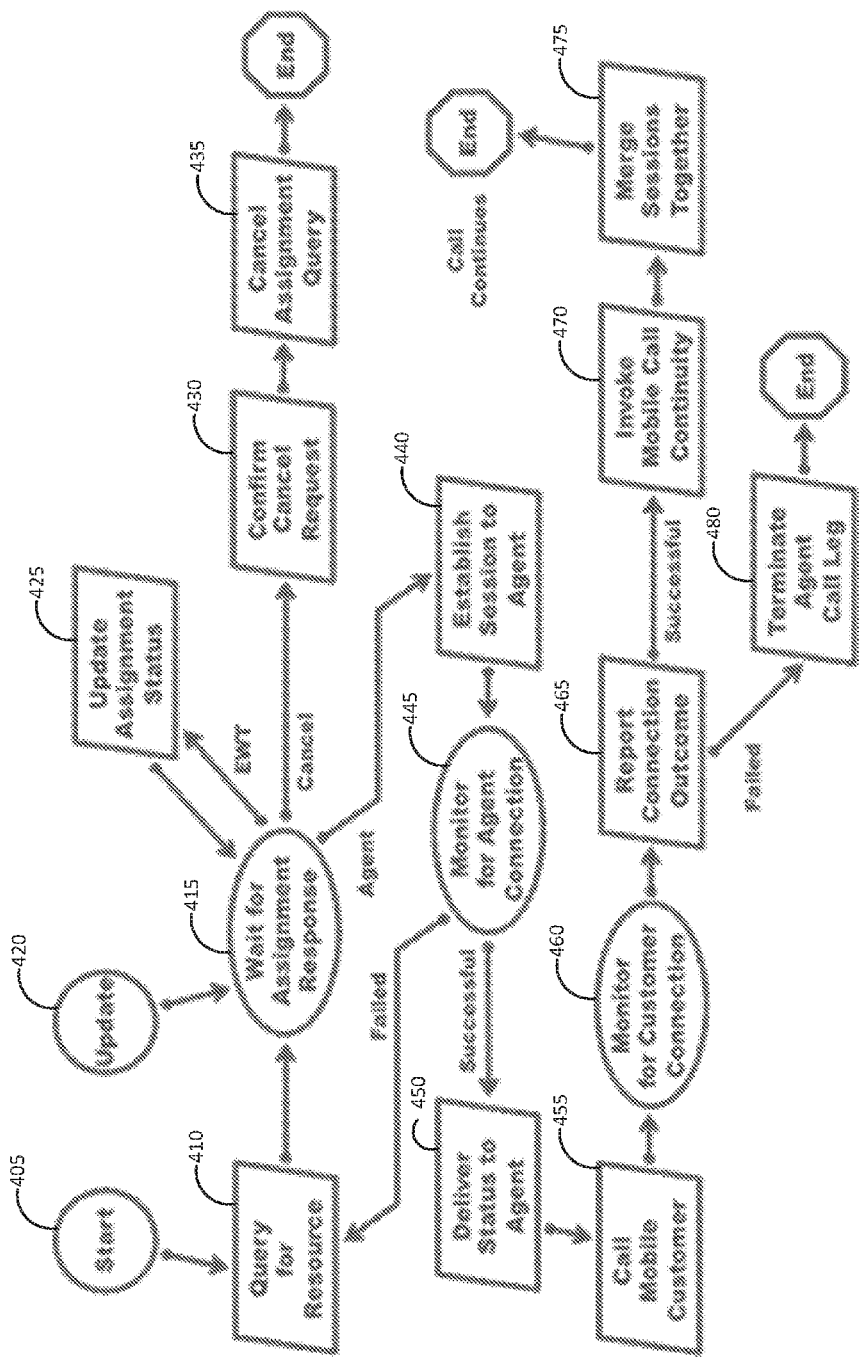
FIG. 4 is a flowchart illustrating a process for providing an agent bonding service according to one embodiment.

FIG. 4 is a flowchart illustrating a process for providing an agent bonding service according to one embodiment. As illustrated in this example, the agent bonding service 120 can be initiated 405 when a customer requests an escalation to a live contact center agent 130 from the mobile web 115. The web service invocation can include a number of parameters that are leveraged by the agent bonding service 120 to determine who the customer is what type of work the customer is requesting. Generally, the more context that is provided from the mobile web 115 to the agent bonding service 120 through these parameters, the more suitable the match between the agent and the customer. The agent bonding service 120 can use this context information to query 410 the enterprise's contact center 125 for an appropriate agent resource. While highly dependent on the contact center 125 vendor, the query from the agent bonding service 120 for an agent resource typically leverages a REST API exposed by the enterprise.

Once the enterprise contact center 125 is queried 410 for an agent resource, the agent bonding service 120 can wait 415 for an agent assignment 420. Ideally the contact center 125 has a viable agent resource match available for the mobile customer. If this is the case, then the agent bonding service 120 can record an outcome and begins its primary leg in which the identified agent and the customer are bonded together into a session as will be described further below. However, there are a few other scenarios that can occur when the contact center 125 does not have a viable agent resource available to appropriately match to the mobile customer's needs.

According to one embodiment, when a request is not immediately fulfilled, i.e., an agent is not immediately available, the contact center 125 can respond with an EWT for when an appropriate resource will be available and, without additional prompting, convey the agent match when the resource does become available. Whenever the agent bonding service 120 receives an EWT, either in response to the initial query or unsolicited updates 425 from the contact center 125, the agent bonding service 120 can update the mobile customer and continue to wait 415. When the agent does become available, the workflow continues down its primary leg, i.e., establishing a session between the agent and the mobile customer.

Other circumstances possibly arise when the request for an agent resource is taking too long. According to one embodiment, when the agent bonding service 120 queries 410 the enterprise contact center 125, it can set a timer. This timer can be reset upon every received EWT update 425 and cancelled once an agent is matched to the mobile customer. However, if the timer expires from a lack of response from the contact center 125, the agent bonding service 120 can record an outcome of "Cancel" and proceed to exit after updating 430 the mobile customer of an error and canceling 435 the work request in the contact center 125. Additionally, the mobile customer may choose to cancel the escalation during this waiting period. If the agent bonding service 120 receives this cancellation, the outcome is also recorded as "Cancel" and the agent bonding service 120 proceeds to exit.

Once both parties to the session have been identified, i.e., the mobile customer from parameters provided in the agent bonding service 120 invocation and the agent resource from the work assignment engine response, the agent bonding service 120 moves to bringing them together into a SIP session. As illustrated here, bonding the agent and mobile customer together can comprise establishing 440 a SIP session to the contact center agent 130. To do this, the agent bonding service 120 can initiate a SIP INVITE to the contact agent assigned to assist with this work. If the agent bonding service 120 is deployed within the enterprise domain, the agent's private extension can be used for addressing the SIP INVITE and the enterprise core can route the call to the agent accordingly. If the agent bonding service 120 is deployed in the carrier network, there are additional considerations with respect to the agent's extension and routing logic. Most contact centers do not expose agent extensions externally, or in other words, agent extensions are not typically matched to DID numbers. One of the advantages of the mobile bonded trunks 260 is that private enterprise dialplans can be extended to the carrier and leveraged from the agent bonding service 120. This approach allows the agent bonding service 120 to address the SIP INVITE to the agent's private extension and route the session through the mobile bonded trunks 260, for example, by manipulating the route-set. However, if the configuration is such that mobile bonded trunks 260 are not being used, the carrier IMS core 210 can route the call to the enterprise, but the onus is on the enterprise contact center 125 to ensure all of the agent extensions are mapped to external DID numbers.

According to one embodiment, the agent bonding service 120 can construct the customer context by combining together information it gathers from the mobile carrier and provided to it from the initial web services invocation. If the agent bonding service 120 is deployed in the carrier network, then the agent bonding service 120 can access the HSS database 245 for additional mobile customer context. If the service is deployed within the enterprise domain, the agent bonding service 120 may use a cloud service, which queries the service provider for additional customer insight. It should be noted that, while reference is made here and elsewhere to an HSS database and IMS customer data store, it should be understood that any customer database and/or customer device database, whether used collectively or separately, can be used in various different embodiments and use of any one or more such databases is considered to be within the scope of the present disclosure.

Once it has attempted to establish 440 the session with the agent, the agent bonding service 120 can monitor 445 for agent connection. While the agent has been assigned to assist the mobile customer and the agent bonding service 120 has attempted to reach out to the agent, there is no guarantee that the agent actually joins the incoming session. Once the agent bonding service 120 attempts to establish 440 the session with the agent, a timer can be set which provides a maximum period for the contact center agent 130 to answer the incoming call and join the session. Then, the agent bonding service 120 waits for one of possibly two conditions to occur.

Ideally, the agent answers the call. The agent bonding service 120 can detect this by receiving a SIP 200 OK during the call setup process. The agent bonding service 120 then proceeds to bring the mobile customer into the session as will be described further below. However, if the timer expires before the agent answers the call, the agent bonding service 120 can cancel the invitation to the agent and starts the process over with another query 410 for an agent assignment.

Once the agent has answered the call but before the agent bonding service 120 attempts to bring the mobile customer into the session, it can deliver 450 status to the contact center agent 130. For example, the agent bonding service 120 can inform the agent that they are being connected to the customer. This can be achieved by using media services 250 to play an announcement before cutting through to the mobile customer session being established. In another example, the SIP INVITE to the contact center agent 130 can include mobile context information. The contact center 125 can display this information to the agent to improve the customer experience. According to one embodiment, the agent bonding service 120 can augment contact centers that do not support this functionality by converting the mobile context into an announcement, via a text-to-speech media service for example, played to the agent before connecting the mobile customer.

Once the contact center agent 130 is in the established session and has been provided insight on the mobile customer that is going to be connected to the session, the agent bonding service 120 can attempt to connect 455 to the mobile customer and bring them into the agent's session. As noted above, one of the parameters in the invocation of the agent bonding service 120 can be the mobile customer's contact number. This contact number can be used to address a SIP INVITE from the agent bonding service 120 to the mobile customer. According to one embodiment, the enterprise can have the ability to choose whether the caller identification that the mobile customer receives from the outbound call is the agent's or a generic enterprise number. If the agent's information is to be conveyed, it can be propagated from the existing SIP session to the agent. If a generic enterprise number is to be used, it can be retrieved by the agent bonding service 120 from the enterprise configuration database 230

Once the SIP INVITE has been sent to the mobile customer, the agent bonding service 120 can monitor 460 for the success or failure of the call attempt to the mobile customer. If the call attempt is successful and the customer answered the call, then the agent bonding service 120 can proceed to merge the existing agent's session with this newly established SIP session as will be described further below. In some cases, additional logic can be included to detect if the call was completed, but redirected by other routing policies to another entity such as to a voicemail service, for example. If the call to the mobile customer was not successful, the agent bonding service 120 marks the call attempt failed if either the network signals a failure to connect, via a SIP BYE or SIP CANCEL message, or a timer expires. If the agent bonding service 120 fails to reconnect the mobile customer to the agent's session, the workflow proceeds to and tear down the existing session to the agent it had established.

Once the attempt to reach the mobile customer has been completed and the success or failure of this attempt is known, the result can be reported 465. For example, the agent bonding service 120 sets expectations to the contact center agent 130, for example, by playing an announcement through a media service of either "Customer has been connected" or "Reaching customer has failed, disconnecting call now" to convey next steps of the agent bonding service 120. Additionally, the agent bonding service 120 can communicate the connection attempt result to the mobile web 115 which can in turn share the result with the mobile customer.

According to one embodiment, there are a number of actions that may be taken outside of the agent bonding service 120 such as fee charging to the enterprise from the carrier if the bonding was successful or a work item created to reach out to the mobile customers at a later time if the connection attempt was unsuccessful. If the agent bonding service 120 is deployed in the carrier network, then these call records can be shared with the carrier's charging functions 225 within their domain to accurately bill the enterprise. Regardless of where the service is deployed, the agent bonding service 120 can update the enterprise by augmenting contact center 125 reports and, optionally, triggering other enterprise workflows through a web services invocation.

If the attempt to reach the mobile customer was successful, i.e., the customer answered the call, the agent bonding service 120 can then invoke 470 the mobile call continuity service 135. Invoking 470 the mobile call continuity service 135 can vary depending on where the service is deployed with respect to where the agent bonding service 120 is deployed.

If both of the agent bonding service 120 and the mobile call continuity service 135 are deployed together, both in the carrier network or both within the enterprise domain, then the agent bonding service 120 can explicitly invoke the mobile call continuity service 135 and not be part of general orchestration. The rationale for this is based on configuration. In the configuration whereby both services are deployed in the carrier network, the carrier is only offering this enhanced mobile call continuity if the enterprise is subscribing to their service and not for all of their mobile subscribers at large. In the other case, such that both services are deployed in the enterprise domain, the enterprise only wants to apply this mobile call continuity service 135 for customers using a mobile device.

In another situation, the agent bonding service 120 may be deployed within the enterprise domain and the mobile call continuity service 135 may be deployed in the carrier network. In such cases, additional logic can be implemented, e.g., within the mobile call continuity service 135, to ensure it is triggered appropriately. Additional details of this logic and other processes performed by the mobile call continuity service 135 will be described below with reference to FIG. 5.

To complete the connection process, the agent bonding service 120 can merge 475 the newly created SIP session to the mobile customer with the established SIP session to the contact center agent 130. The mobile call continuity service 135, invoked in the previous step, can remain in the signaling path, for example, as a B2BUA with the media traversing directly from the mobile customer to the contact center agent 130. The agent bonding service 120 has now bonded the mobile customer with the appropriate contact center agent 130 and can exit the session.

If the attempt to call the mobile customer was unsuccessful, the agent bonding service 120 can terminate the call to the agent. That is, since this mobile customer was not connected to the established agent's session, the agent bonding service 120 tears down the agent's leg of the call by issuing a SIP BYE to the contact center 125. The agent bonding service 120 then exits. As described above, the mobile web 115 may have been informed of the failed call attempt. If the customer reattempts to escalate to an agent after this notification, it may be handled as a new request and the agent bonding service 120 processes can begin again.

Mobile Call Continuity Service 135

While the quality of cellular coverage is rapidly improving, mobile connections are not as stable as landline networks at this time. Mobile users have gained a tremendous amount of flexibility on where and when they can have interactions, but have taken a few steps backwards with respect to the stability of these sessions. Session failures appear as call abandons to the enterprise contact center 125 negatively impacting their Key Performance Indicators (KPI) in addition to negatively impairing the customer's perception of the contact center 125 experience and of the quality of the mobile carrier. The mobile call continuity service 135 can improve the engagement between businesses and their mobile customers over less than perfect conditions.

Unfortunately, the scenario whereby a mobile customer is unexpectedly disconnected during an interaction with a contact center agent 130 is all too common. When this occurs, contact centers have two choices. They can cross their fingers and hope the customer calls back or they can instruct their agents to try and reconnect to the customer. Both of these approaches are problematic. If the customer does decide to call back the enterprise, the contact center 125 typically treats this as a new interaction. CSAT is negatively impacted as the customer has to essentially start over with another agent and operational metrics, such as first call resolution, lose their value. The other approach, having contact center agents directly calling back customers, requires an agent to request a call back number from the customer at the beginning of the call, which extends the call duration and may cause customer frustration, and the enterprise must now enable inbound contact center agents to have the ability to place outbound calls, which is not always an ideal situation. Additionally, the contact center 125 is challenged on how to connect these two calls together effectively.

According to one embodiment, the mobile call continuity service 135 can orchestrate the reconnection of a mobile customer to an existing session without requiring any changes to the contact center 125. Moreover, the contact center 125 can be kept unaware of any unexpected disconnects, or drops, from mobile customers. Thus, from the contact center's viewpoint, the engagement appears to be one, single continuous session. The mobile call continuity service 135 can be implemented as a Back-to-Back User Agent (B2BUA) residing between the mobile customer and the contact center 125. If the customer unexpectedly disconnects from the session, the service captures this event, but does not pass it on to the enterprise. Rather, the mobile call continuity service 135 can attempt to reconnect the customer to the existing session. From an operational standpoint, the enterprise can be completely unaware this process took place and the customer can continue addressing their needs without starting the conversation over with another agent.

The mobile call continuity service 135 can be invoked explicitly from either of the front-door redirection service 110 or the agent bonding service 120 when the mobile call continuity service 135 is deployed in the same location as the other two services. For example, if both the mobile call continuity service 135 and front-door redirection service 110 are both deployed in the carrier network, then explicit invocation can be achieved. However, if the mobile call continuity service 135 is deployed in the carrier network, but the agent bonding service 120 is within the enterprise domain, then another invocation method can be used. In such cases, the mobile call continuity service 135 can be invoked as part of sequencing of the session.

Figure 5:
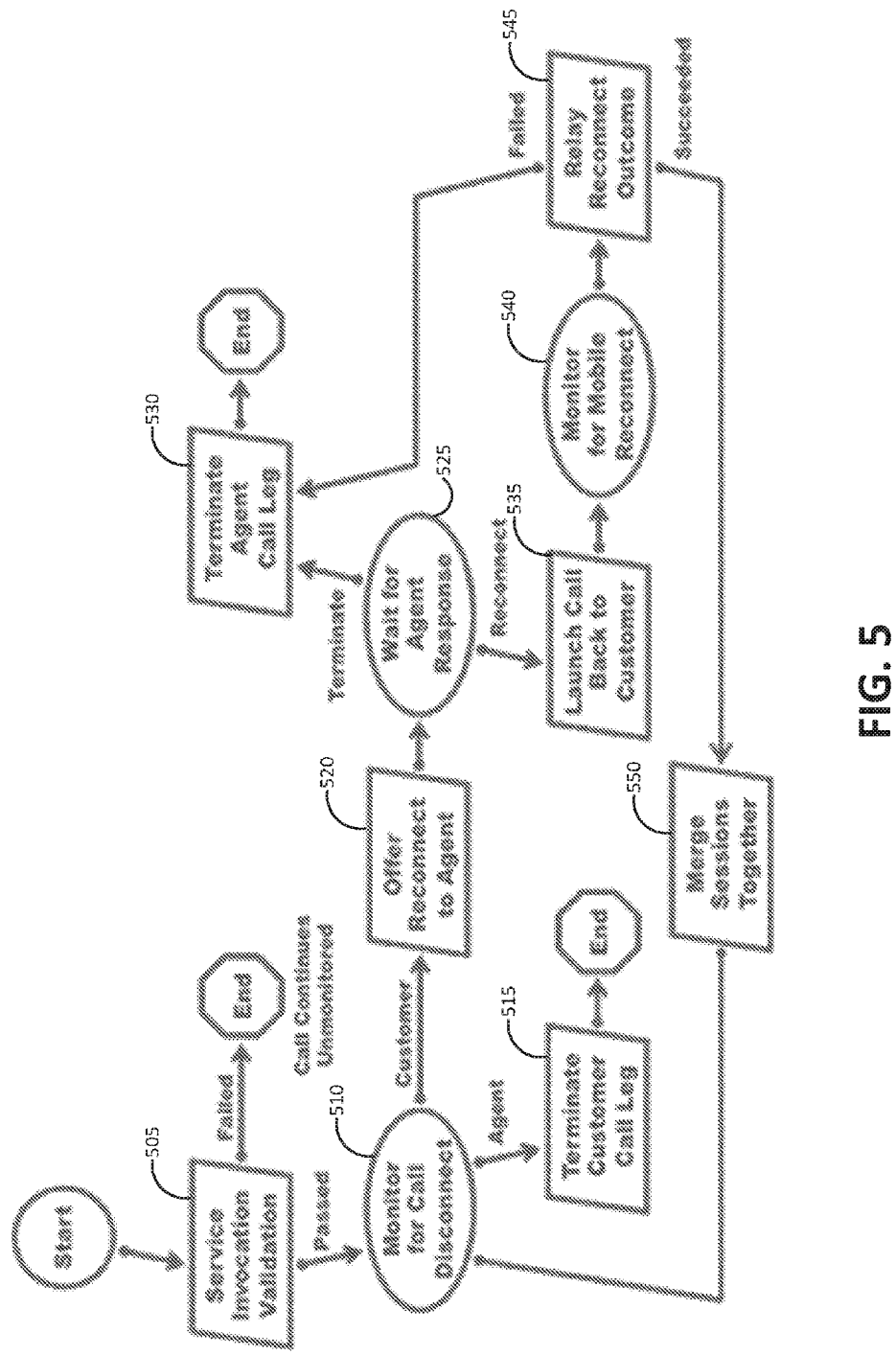
FIG. 5 is a flowchart illustrating a process for providing a mobile call continuity service according to one embodiment.

FIG. 5 is a flowchart illustrating a process for providing a mobile call continuity service according to one embodiment. As illustrated in this example, the mobile call continuity service 135 process can begin with validating the service invocation. As described above, there are two conditions through which a mobile customer establishes a connection with a contact center agent 130. The first is when a customer opts to decline a mobile experience through the front-door redirection service 110 and the second is when the customer escalates from the mobile web 115 to an agent, which is facilitated by the agent bonding service 120. If the services are co-located, then both the front-door redirection and agent bonding services 120 can explicitly invoke the mobile call continuity service 135. In this case, validation 505 can be assumed for its invocation and skipped by the mobile call continuity service 135 since validation was done in the other, invoking service.

However, other deployment models in which the services are not co-located are not conducive to explicit invocation of the Mobile call continuity service 135. In these models, invocation of the mobile call continuity service 135 can be performed through sequencing.

In the deployment model in which the front-door redirection service 110 and mobile call continuity service 135 are implemented on the carrier network and the agent bonding service 120 is implemented in the enterprise domain, when the agent bonding service 120 attempts to reach out to the mobile user, it routes the call setup from the enterprise to the carrier over a mobile bonded trunk 260. The carrier sequences incoming traffic on these trunks and thus, can invokes the mobile call continuity service 135. In the deployment model in which the front-door redirection service 110 is implemented on the carrier network and the agent bonding service 120 and mobile call continuity service 135 are in the enterprise domain, when the front-door redirection service 110 routes the SIP session to the enterprise, it traverses a mobile bonded trunk 260. The enterprise sequences incoming traffic on these trunks and thus, can invokes the mobile call continuity service 135. In both cases, since traffic traversed the mobile bonded trunk 260, it can be assumed that all validations have passed.

If a call enters an enterprise from the carrier over basic trunks 275, the enterprise can verify that this is in fact a mobile user. There are a number of cloud services, invoked through a REST API, that query the service provider to determine if the call is coming from a mobile extension. If a call enters the carrier from the enterprise over standard SIP trunks 275, it eventually routes to the mobile carrier's IMS core 210. At this point, by definition, the call can be considered as being from a mobile subscriber and the enterprise can invoke the mobile call continuity service 135 as part of termination sequencing for that mobile user. If invoked through this manner, validation 505 by the mobile call continuity service 135 can include verifying that the call out to the mobile user originated from an enterprise that is subscribed to the mobile bonded network solution. This can be accomplished, for example, by referencing the enterprise configuration database 230 using the calling party number as the key.

Once invocation has been validated 505, the mobile call continuity service 135 can monitor 510 the call for an unexpected disconnect from a mobile user and then take action to reconnect the mobile user if it occurs. According to one embodiment, monitoring 510 the call can comprise examining the SIP session for any SIP BYE messages. Once this is detected, the mobile call continuity service 135 can continue based on which party initiated the call termination, either the contact center agent 130 or the mobile user. If the call was terminated from the contact center agent's side, this signifies that the engagement is complete and therefore the mobile call continuity service 135 can terminate 515 the mobile customer's connection to the session.

If the call was terminated from the mobile user's side, the mobile call continuity service 135 can attempt to reconnect the mobile customer to the existing session if appropriate. The attempt can begin with offering 520 reconnection to the agent. Since the agent likely understands from the context of the conversation if the engagement was completed naturally or they were unexpectedly disconnected from the customer, the mobile call continuity service 135 can instruct the media service to fetch and execute the appropriate VXML script for this interaction. The VXML script can begin with an announcement to the agent such as, "A disconnect from the mobile customer has been detected. If you would like to reconnect the customer to this session, please say yes or press 1 now."

At this point, the mobile call continuity service 135 can wait 525 for the agent's response, which can be provided when the VXML script executing within the media service has completed. The agent's decision can be recorded as reconnect or terminate. Another case that should be considered is a lack of response from the agent. This condition arises if the VXML script completes without an agent response before a timer expires. In this case, the agent's decision can recorded as terminate. If the agent's decision is terminate 530, the mobile call continuity service 135 can proceed to tear down the entire session. Because the mobile customer is already disconnected from the session, the mobile call continuity service 135 can accomplish termination by disconnecting the agent from the session.

If the agent's decision is reconnect, the mobile call continuity service 135 can attempt to reconnect the mobile customer to the existing agent session. Specifically, the mobile call continuity service 135 can launch 535 a call to the mobile customer via a SIP INVITE. The enterprise can have the ability to choose whether the caller identification that the mobile customer receives from the outbound call is the agent's or a generic enterprise number. If the agent's information is to be conveyed, it can be propagated from the existing SIP session with the agent. If a generic enterprise number is to be used, it can be retrieved, for example, from the enterprise configuration database 230.

Unfortunately, there are no guarantees that the outbound call to the mobile customer is answered for a number of reasons. These reasons include, but are not limited to, a lack of coverage, a drained battery, or simply, the mobile customer does not answer the call. Therefore, the mobile call continuity service 135 can monitor 540 for the success or failure of the call attempt to the mobile customer. The mobile call continuity service 135 can mark the call attempt unsuccessful if either the network signals a failure to connect, via a SIP BYE or SIP CANCEL message, or a timer, which is required to be set when entering this step in the workflow, expires. If the service fails to reconnect the mobile customer to the agent's session, the mobile call continuity service 135 can then relay 545 this outcome to the agent by playing an announcement through a media service such as "Reconnect attempt failed, disconnecting call now" and proceed to terminate 530 the existing session to the agent it was maintaining.

If the call attempt is successful whereby the customer answered the call, the mobile call continuity service 135 can relay 545 this outcome by playing an announcement through a media service such as "Reconnecting customer now." It should be noted that there may also be a number of actions outside of the mobile call continuity service 135 such as fee charged to the enterprise from the carrier, if the reconnect was successful, or a work item created to reach out to the mobile customer at a later time, if the reconnect was unsuccessful. If the mobile call continuity service 135 is deployed in the carrier network, then these call records can be shared with the carrier's charging functions 225 within their domain to accurately bill the enterprise. Additionally, regardless of where the service is deployed, the mobile call continuity service 135 can update the enterprise by augmenting contact center 125 reports and, optionally, triggering other enterprise workflows through a web services invocation.

To complete the reconnection process, the mobile call continuity service 135 can merge 550 the newly established SIP session to the mobile customer with the existing SIP session to the contact center agent 130. The mobile call continuity service 135 can remain in the signaling path as a B2BUA with the media traversing from the mobile customer to the contact center agent 130. The mobile call continuity service 135 can also return to monitoring 510 for possibly another unexpected mobile disconnect as described above.

The present disclosure, in various aspects, embodiments, and/or configurations, includes components, methods, processes, systems, and/or apparatus substantially as depicted and described herein, including various aspects, embodiments, configurations embodiments, sub combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for providing a mobility bonded network service, the method comprising:
    receiving, by a server executing a redirection service, a setup message for a voice call from a device on a mobile network operator network;
    determining, by the server executing the redirection service, whether to redirect the device to a mobile web or forward the received setup message for the voice call to a contact center;
    in response to determining to redirect the device to the mobile web, orchestrating, by the server executing the redirection service, a redirection of the device to the mobile web and terminating the voice call;
    in response to determining to forward the received setup message for the voice call to the contact center, enhancing, by the server executing the redirection service, the setup message with auxiliary customer information and forwarding the enhanced setup message from the server executing the redirection service to the contact center, wherein the enhanced setup message is forwarded to the contact center via a communication network other than a toll-free network;
    receiving, by an agent bonding service from the device, a request for a voice call connection with an agent of the contact center, the request received after the device has been redirected to the mobile web and including parameters defining a context of the request;
    querying, by the agent bonding service, the contact center for an available agent based on the parameters defining the context of the request;
    receiving, by the agent bonding service from the contact center, an indication of an available agent or an estimated wait time until an agent is available;
    in response to receiving the indication of the available agent, initiating, by the agent bonding service, a voice call between the device and the available agent and launching, by the agent bonding service, a mobile call continuity service; and
    in response to receiving the estimated wait time until the agent is available, providing, by the agent bonding service to the device, the received estimated wait time.

2. The method of claim 1, wherein determining whether to redirect the device to the mobile web or forward the received setup message for the voice call to the contact center comprises:
    validating an invocation of the redirection service based on the received setup message; and
    offering a mobile-specific experience to a caller through the device, wherein determining whether to redirect the device to the mobile web or forward the received setup message for the voice call to a contact center is based on an answer to the offer received from the device.

3. The method of claim 1, wherein orchestrating the redirection of the device to the mobile web comprises:
    creating a link to a destination of the mobile web specific to a caller and based on customer data for the caller; and
    providing the created link to the device.

4. A method for providing a mobility bonded network service, the method comprising:

receiving, by a server executing a redirection service, a setup message for a voice call from a device on a mobile network operator network;

determining, by the server executing the redirection service, whether to redirect the device to a mobile web or forward the received setup message for the voice call to a contact center;

in response to determining to redirect the device to the mobile web, orchestrating, by the server executing the redirection service, a redirection of the device to the mobile web and terminating the voice call; and in response to determining to forward the received setup message for the voice call to the contact center, enhancing, by the server executing the redirection service, the setup message with auxiliary customer information and forwarding the enhanced set up message from the redirection service to the contact center, wherein enhancing the setup message with auxiliary customer information and forwarding the enhanced set up message to the contact center comprises:

retrieving the auxiliary information from a repository of customer data, the auxiliary information providing a context for the voice call;

attaching the retrieved auxiliary information to the received set up message to form the enhanced message;

determining a number indicated by an entity operating the contact center;

forwarding the enhanced message with the attached auxiliary information to the number indicated by the entity operating the contact center; and launching a mobile call continuity service.

5. The method of claim 4, wherein the mobile call continuity service maintains a voice call between the device and an agent of the contact center by:

monitoring the voice call for an unexpected disconnection of the device;

upon detecting an unexpected disconnection of the device, offering to the agent of the contact center an opportunity to reconnect to the device;

in response to receiving an answer from the agent of the contact center indicating a selection to reconnect, attempting to reconnect to the device; and in response to receiving an answer from the agent of the contact center indicating a selection to terminate, terminating the voice call.

6. The method of claim 5, wherein attempting to reconnect the device comprises one or more of initiating a call to the device or sending a message to the device.

7. The method of claim 6, wherein attempting to reconnect the device is performed in response to detecting availability of the device on the mobile network operator network.

8. The method of claim 4, wherein the set up message for the voice call comprises a call to a toll free number and wherein the number indicated by the entity operating the contact center is selected based on a current location of the device or a billing address of an owner of the device.

9. A system comprising a mobility bonded network service, the mobility bonded network service comprising:

a processor; and a memory coupled with the processor and comprising a set of instruction stored therein which, when executed by the processor, causes the processor to provide a redirection service by:

receiving a setup message for a voice call from a device on a mobile network operator or mobile virtual network operator network, determining whether to redirect the device to a mobile web or forward the received setup message for the voice call to a contact center, in response to determining to redirect the device to the mobile web, orchestrating a redirection of the device to the mobile web and terminating the voice call, and in response to determining to forward the received setup message for the voice call to the contact center, enhancing the setup message with auxiliary customer information and forwarding the enhanced setup message to the contact center, wherein enhancing the setup message with auxiliary customer information and forwarding the enhanced set up message to the contact center comprises:

retrieving the auxiliary information from a repository of customer data, the auxiliary information providing a context for the voice call;

attaching the retrieved auxiliary information to the received set up message to form the enhanced message;

determining a number indicated by an entity operating the contact center; and forwarding the enhanced message with the attached auxiliary information to the number indicated by the entity operating the contact center.

10. The system of claim 9, wherein determining whether to redirect the device to the mobile web or forward the received setup message for the voice call to the contact center comprises:

validating an invocation of the redirection service based on the received setup message; and offering a mobile-specific experience to a caller through the device, wherein determining whether to redirect the device to the mobile web or forward the received setup message for the voice call to a contact center is based on an answer to the offer received from the device.

11. The system of claim 9, wherein orchestrating the redirection of the device to the mobile web comprises:

creating a link to a destination of the mobile web specific to a caller and based on customer data for the caller; and providing the created link to the device.

12. The system of claim 11 further comprising an agent bonding service, the agent bonding service comprising:

a processor; and a memory coupled with the processor and comprising a set of instructions stored therein which, when executed by the processor, causes the processor to bond an agent of the contact center to a voice call by:

receiving, from the device, a request for the voice call with the agent of the contact center, the request received after the device has been redirected to the mobile web and including parameters defining a context of the request;

querying the contact center for an available agent based on the parameters defining the context of the request;

receiving, from the contact center, an indication of an available agent or an estimated wait time until an agent is available;

in response to receiving the indication of the available agent, initiating the voice call between the device and the available agent and launching a mobile call continuity service; and in response to receiving the estimated wait time until the agent is available, providing the received estimated wait time.

13. The system of claim 12, further comprising a mobile call continuity service, the mobile call continuity service comprising:
a processor; and
a memory coupled with the processor and comprising a set of instructions stored therein which, when executed by the processor, causes the processor to maintain a voice call between the device and an agent of the contact center by:
monitoring the voice call for an unexpected disconnection of the device;
upon detecting an unexpected disconnection of the device, offering to the agent of the contact center an opportunity to reconnect to the device;
in response to receiving an answer from the agent of the contact center indicating a selection to reconnect, attempting to reconnect to the device; and
in response to receiving an answer from the agent of the contact center indicating a selection to terminate, terminating the voice call.

14. The system of claim 13, wherein the redirection service, the agent bonding service, and the mobile call continuity service are each located on the mobile network operator or mobile virtual network operator network.

15. The system of claim 13, wherein the redirection service and the agent bonding service are each located on the mobile network operator or mobile virtual network operator network and wherein the mobile call continuity service is located outside of the mobile network operator or mobile virtual network operator network.

16. The system of claim 13, wherein the redirection service is each located on the mobile network operator or mobile virtual network operator network and wherein the agent bonding service and the mobile call continuity service are each located outside of the mobile network operator or mobile virtual network operator network.

17. The system of claim 13, wherein the redirection service, the agent bonding service, and the mobile call continuity service are each located outside of the mobile network operator or mobile virtual network operator network.

18. A non-transitory computer readable medium comprising a set of instructions stored therein which, when executed by a processor, causes the processor to provide a mobility bonded network by:
receiving, by a server executing a redirection service, a setup message for a voice call from a device on a mobile network operator or mobile virtual network operator network;
determining, by the server executing the redirection service, whether to redirect the device to a mobile web or forward the received setup message for the voice call to a contact center;
in response to determining to redirect the device to the mobile web, orchestrating, by the server executing the redirection service, a redirection of the device to the mobile web and terminating the voice call;
in response to determining to forward the received setup message for the voice call to the contact center, enhancing, by the server executing the redirection service, the setup message with auxiliary customer information and forwarding the enhanced setup message from the redirection service to the contact center, wherein the enhanced setup message is forwarded to the contact center via a communication network other than a toll-free network;
receiving, by an agent bonding service from the device, a request for a voice call connection with an agent of the contact center, the request received after the device has been redirected to the mobile web and including parameters defining a context of the request;
querying, by the agent bonding service, the contact center for an available agent based on the parameters defining the context of the request;
receiving, by the agent bonding service from the contact center, an indication of an available agent or an estimated wait time until an agent is available;
in response to receiving the indication of the available agent, initiating, by the agent bonding service, a voice call between the device and the available agent and launching, by the agent bonding service, a mobile call continuity service; and
in response to receiving the estimated wait time until the agent is available, providing, by the agent bonding service to the device, the received estimated wait time.

* * * * *